United States Patent

Walsh et al.

[15] 3,659,949
[45] May 2, 1972

[54] LASER BEAM SYSTEMS AND APPARATUS FOR DETECTING AND MEASURING PARAMETRIC DEVIATIONS BETWEEN SURFACES AND THE LIKE

[72] Inventors: Robert R. Walsh; Martin A. Apostolico, both of Wilmington, Del.

[73] Assignee: Technidyne, Inc., Wilmington, Del.

[22] Filed: Apr. 20, 1970

[21] Appl. No.: 30,174

[52] U.S. Cl. .................................. 356/156, 172/4.5, 350/97
[51] Int. Cl. ............................................................. G01b 11/00
[58] Field of Search .................. 356/156, 138, 140; 172/4.5; 250/236; 180/98, 79, 79.1

[56] References Cited

UNITED STATES PATENTS

| 3,307,164 | 2/1967 | Zimmer | 250/236 X |
| 3,046,681 | 7/1962 | Kutzler | 172/4.5 |
| 3,554,291 | 1/1971 | Rogers et al. | 172/4.5 |

Primary Examiner—William L. Sikes
Assistant Examiner—Edward S. Bauer
Attorney—Birch and Birch

[57] ABSTRACT

A deviation detection and measuring system and apparatus are provided for determining the proper generation of roadbed surfaces and the like in which a laser beam is projected from each side of an ambulatory road grader onto retro-reflective targets of predetermined configuration adjacent to the roadbed, said targets having a known orientation with respect to the ultimately desired dimensions and orientation of the roadbed. Detection devices on the grader detect the laser beams reflected from the target configurations and effectuate a readout such that the current dimensional parameters of the roadbed are determined and compared with the ultimately desired dimensional parameters thereof.

15 Claims, 15 Drawing Figures

Patented May 2, 1972

INVENTOR
ROBERT R. WALSH
MARTIN A. APOSTOLICO

BY Birch & Birch
ATTORNEY

INVENTOR
ROBERT R. WALSH
MARTIN A. APOSTOLICO

*INVENTOR*
ROBERT R. WALSH
MARTIN A. APOSTOLICO

BY Birch & Birch
*ATTORNEY*

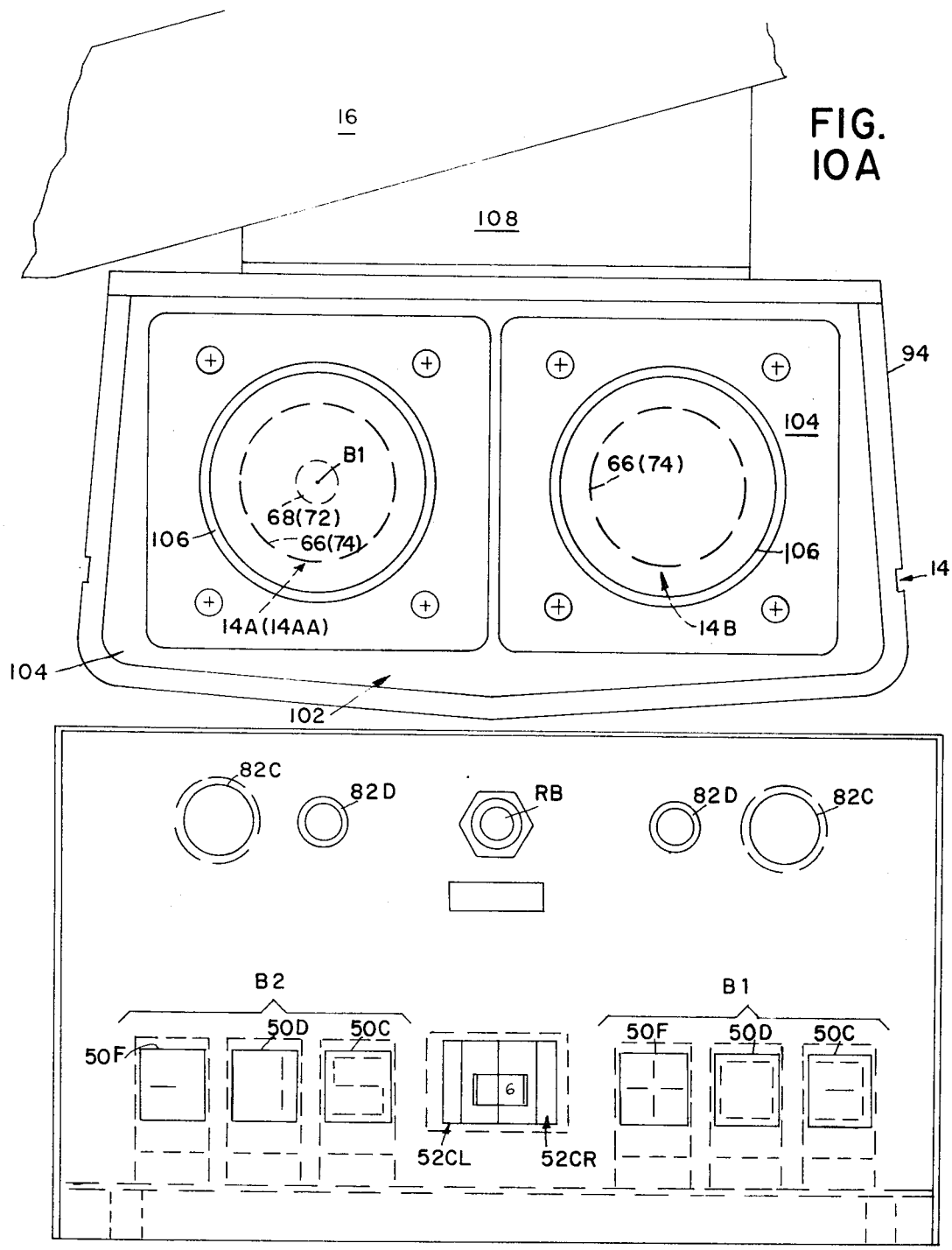

INVENTOR
ROBERT R. WALSH
MARTIN A. APOSTOLICO

BY *Birch & Birch*

ATTORNEY

LASER BEAM SYSTEMS AND APPARATUS FOR DETECTING AND MEASURING PARAMETRIC DEVIATIONS BETWEEN SURFACES AND THE LIKE

This invention relates to systems for effecting the accurate grading of road beds and the like by means of conventional ambulatory road grading vehicles having a new and novel laser beam projection, reflection, detecting and readout system associated therewith.

More particularly, according to the present invention, a laser beam is projected from each side of an ambulatory road grader onto retro-reflective targets of predetermined configuration adjacent to the roadbed, said targets having a known orientation with respect to the ultimately desired dimensions and orientation of the roadbed. Detection devices on the grader detect the laser beams reflected from the target configurations and effectuate a readout such that the current dimensional parameters of the roadbed are determined and compared with the ultimately desired dimensional parameters thereof.

It is a primary object of this invention to provide new and novel laser beam systems which provide elevation and grade deviation information to the operator of a road grader or other earth moving equipment by visual readout and to effect either manual or automatic control of of such equipment as a function of such information.

It is another object of this invention to provide new and novel laser beam systems for the determination of informational parameters such as dimensions, orientation and the like.

Another object of this invention is to provide new and novel retro-reflective target devices adapted to cooperate with a relatively movable laser beam and detector means to provide an information signal format from which informational parameters such as elevation deviation and other dimensional quantities can be derived and/or controlled.

These and other objects of the present invention will become more fully apparent with reference to the following specification and drawings which relate to a preferred embodiment of the invention.

In the drawings:

FIGS. 10A, 10B and 10C are end, top and side views, respectively, of the laser beam transducer and projector of the present invention, with the latter two Figures in partial cross-section; and FIG. 11 is a front plan view of a readout panel of the present invention to be located in the cab area of a road grader as a visual display for the driver of the grader.

THE BASIC PROBLEM

Figure 1A:
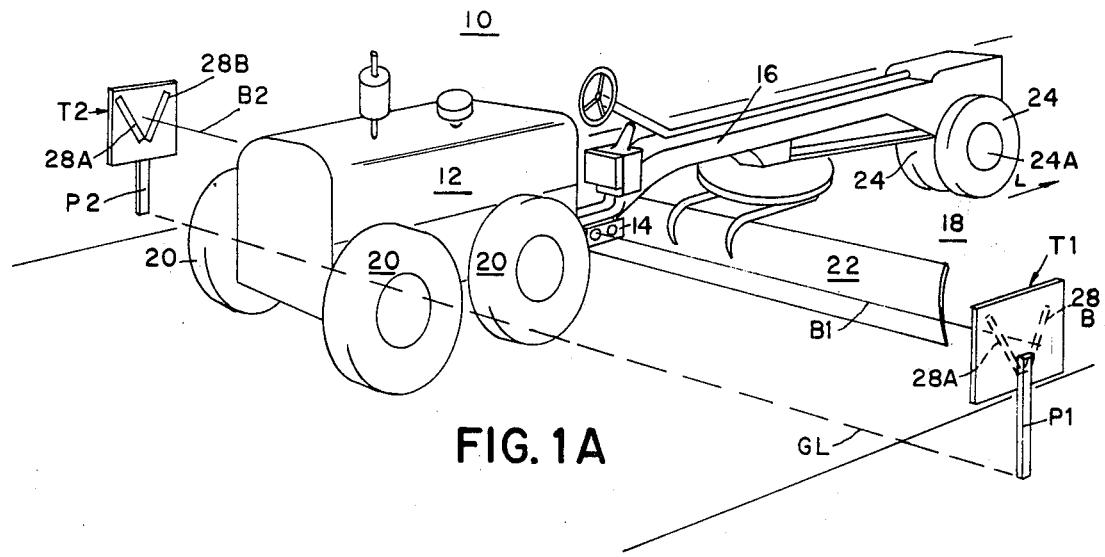
FIG. 1A is a perspective of a road grader embodying the present invention and positioned on a roadbed to be graded.

Accurate finishing of roadbed grading in highway construction is of economic significance to the contractor since it directly affects the required volume of his most expensive materials, namely, the select borrow which underlies the concrete and the concrete itself.

Further, if accurate finish grading can be accomplished with ease and simplicity, reduced costs in time and labor, involving expensive men and machines, will result.

Present practice in highway roadbed construction is to have grade stakes set on opposite sides of the area to be graded, each pair being about 50 ft. from adjacent pairs.

Further, in present practice, two men draw a string line tight across the tops of a pair of grade stakes while a third man observes or measures the elevation of the string above the roadbed surface and signals to the approaching ambulatory grader operator, by hand signals, what correction of the grader blade orientation to make when he reaches that part of the roadbed.

Obviously, the present practice is time consuming and prone to inaccuracies attendant to such hit-and-miss techniques.

THE BASIC INVENTION AND SOLUTION

Such surfaces as those of highway roadbeds are usually comprised of complex curves. When well and properly graded, however, such surfaces are such that they contain (can be generated by) straight line elements having a predetermined definitive relationship to the desired grade.

In the case of highway roadbeds and the like, the key straight line element is the transverse straight line element through the longitudinal axis of the roadbed connecting points on opposite sides of that roadbed at the roadbed surface.

The system of the present invention embodies a combination of devices which utilize this key straight line element in a roadbed surface to provide direct readout of the required grade correction to the road grader operator and, in certain embodiments of the invention, provides automatic control of the grader blade to produce the desired elevation and configuration of the desired roadbed surface with optimally minimized man and machine hours and optimally maximized accuracy.

The drive wheels of a conventional road grader are rigidly positioned at the operator's cab thereof and follow the graded surface immediately behind the grader blade which produces that surface. Therefore, the cab and main frame of the grader will follow the elevation of the graded surface with reference to the desired transverse line parameter of the roadbed surface at any given point.

A laser beam projection device is attached to the main frame of the grader or to the cab and is of the type that will transmit two laser beams of substantially equal intensity in opposed straight line relationship. This laser device is oriented on the grader such that the two opposed laser beams will form a line parallel to the transverse dimension of the graded surface on which the grader rides at a known elevation above that surface.

Both ends (outputs) of the laser device are provided with return beam detectors such that the response of each beam to respective but cooperatively disposed retro-reflective targets mounted in opposition on the transverse axis of the roadbed, each at a given elevation above the desired, ultimate, transverse line parameter of the roadbed.

These targets are placed on the conventional or similar side stakes such that the midpoint of each is elevated above the ultimate desired grade surface by the same distance that the respectively associated laser beam is elevated above the surface on which the grader rides.

Hence, when each laser beam traverses the mid point of its respective target the grader will be riding on a surface corresponding to the ultimate desired graded surface.

The targets are of a configuration such that they reflect a laser beam traversing their surfaces to produce a response function determinative of elevation of the beam thereon. As will be more fully described hereinafter, when the grader operator obtains a readout of a data sensed by the return beam detectors indicating a midpoint crossing of both targets by the respective laser beams, then the operator knows that his grader has formed the roadbed surface precisely to the ultimately desired grade.

The system of the present invention can also utilize the sensed data to effect automatic blade control and program error correcting settings of the grader blade for subsequent passes of the grader over a predetermined length of roadbed.

Both the system providing readout for manual correction of the grader blade setting and the system providing automatic blade setting utilize a train of reference pulses continuously generated to indicate the distance along the roadbed longitudinal axis travelled by the grader. Each pulse represents a small increment of advance along the roadbed. During the traverse of a given target by its respectively associated laser beam; a train of these pulses is gated into a counter by the laser beam reflected from the target. The pulse count of the finite train is proportional to elevation as constrained by the configuration of the retro-reflective target devices.

The systems of the present invention are clearly operative to effect grade on curved or banked highway roadbeds, since they depend solely upon the existence of the transverse straight line elements from which all such surfaces are generated.

THE GENERAL SYSTEM

Figure 1B:
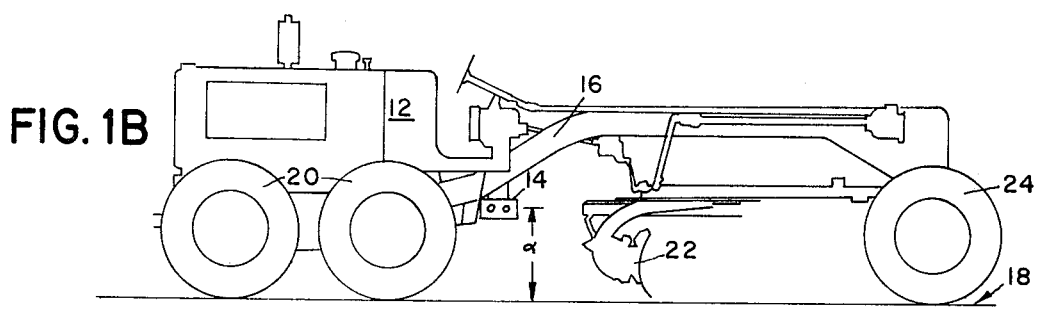
FIG. 1B is a side elevation of the grader and roadbed shown in FIG. 1A.

Referring in detail to FIGS. 1A and 1B, the general grader control system 10 of the present invention will now be described.

The grader 12 carries a laser projection and detection means 14 shown mounted on the grader frame 16 such that when the grader 12 moves down the roadbed 18 along or parallel to the longitudinal axis L of the latter, first and second laser beams B1 and B2 are projected transversely of the roadbed axis L in a vertical plane containing one of the key transverse grade lines GL, which define the orientation and grade of the ultimately desired surface of the graded roadbed 18.

First and second retro-reflective target devices T1 and T2 are mounted on grade poles P1 and P2, respectively, on opposite sides of the roadbed 18 in line with the first and second laser beams B1 and B2, respectively.

The laser beams B1 and B2 are projected across the roadbed 18 between the drive wheels 20 of the grader 12 and the grader blade 22, as shown, at a known elevation (vertical distance) $d$ above the roadbed 18.

The grader blade 22 is adjustably suspended beneath the frame 16 between the drive wheels 20 and the steering or dirigible wheels 24 of the grader 12.

The retro-reflective targets T1, and T2 are positioned on the respective grade poles P1 and P2 such that the midpoints of the vertical target axis are elevated above one of the desired grade lines GL a distance equal to the known elevation $d$ of the laser beams B1 and B2 above the roadbed surface 18. These targets will be hereinafter more fully described with reference to FIGS. 2A and 2B and in conjunction with the description of operation of the system.

THE RETRO-REFLECTIVE TARGETS

Figure 2B:
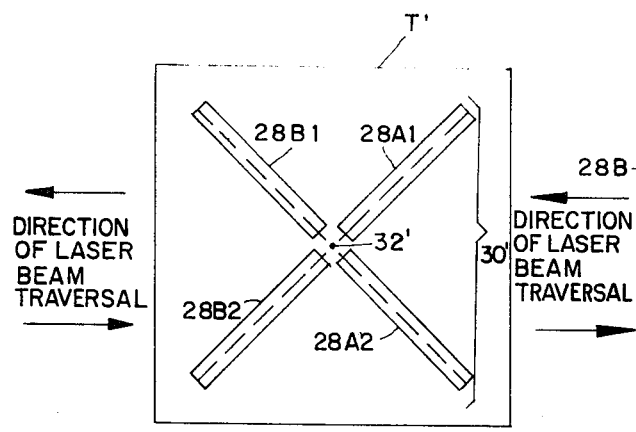
FIGS. 2A and 2B are a front plan views, respectively, of embodiments of two retro-reflective target devices of the present invention.
Figure 2A:
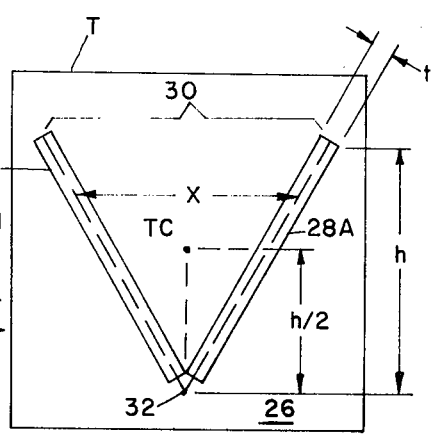

Referring to FIG. 2A, a retro-reflective target T, representative of the targets T1 and T2 of FIG. 1, is shown as including a flat target board 26 upon which a pair of retro-reflective linear strips 28A and 28B are arranged in an upwardly diverging "V" shaped target configuration 30.

The term "retro-reflective" designates any reflective material which reflects an incident beam, such as a laser beam of coherent light, back along substantially its own axis of propagation. An example of such a material is a standard bicycle tail reflector or automative reflector which consists of a labyrinth of corner prisms, each of these corner prisms having known retro-reflective properties.

In a preferred embodiment of the target T, the slope of the divergent strips 28A and 28B is in the ratio 2:1, i.e., two vertical increments for each horizontal increment. The height H of the target configuration 30 is made equal to the horizontal dimension $x$ across the open end of the "V" thereof. The horizontal dimension $x$ is taken between symmetrically related points on each of the strips 28A and 28B and is shown as taken between the longitudinal axes thereof. The vertical dimension $h$ is taken from the level of the apex 32 defined by the intersection of the longitudinal axes of the strips 28A and 28B to the vertical intercept with the longitudinal axis of the adjacent one of the strips 28A and 28B at the point where the horizontal dimension $x$ is determined.

Because of the 2:1 slope of the strips 28A, 28B, the horizontal dimension $x$, through any given point of the target configuration 30, is equal to the vertical dimension $h$ of that point on the target configuration 30.

The reflective strips 28A, 28B are rectilinear in configuration, as shown, and are of a width $t$ which, preferably, is slightly greater than the diameter of the largest laser beam to be impinged upon the target T. This will be more fully described hereinafter.

Referring to FIG. 2B, a target T' is shown with retro-reflective strips 28A1, 28B1, 28A2, 28B2 in an "X" configuration 30', which may also be described as an "opposed V" configuration about a common apex 32'. The area about the apex 32' is not retro-reflective in the target configuration 30'. As will be hereinafter more fully described, both of the targets T, T' are intended to produce a pair of pulse-like retro-reflections of a laser beam as it traverses the said targets and impinges upon first one and then the other of the divergent strips 28A-28B, 28A1-28B1, 28A2-28B2.

Accordingly the apices 32, 32' are not placed, in practice, at the desired ultimate dimensional reference. Rather, as exemplified in FIG. 2A, the target "center" TC is located somewhere along the vertical axis of the divergent configurations 30, 30' such as at a height from the apices 32, 32' of one-half the vertical dimension $h$ of the "V" configuration 30 or one of the two "V" configurations comprising the "X" configuration 30'.

The slope of the divergent legs 28A1, 28B1, 28A2, 28B2 in the "X" configuration 30' is preferably 2:1 as previously described with reference to the "V" configuration 30. This provides a direct readout of vertical orientation of a traversing laser beam on the targets T, T', although with the use of suitable conversion constants, other slopes can be utilized.

THE GRADE DEVIATION MEASURING SYSTEM

Figure 3:
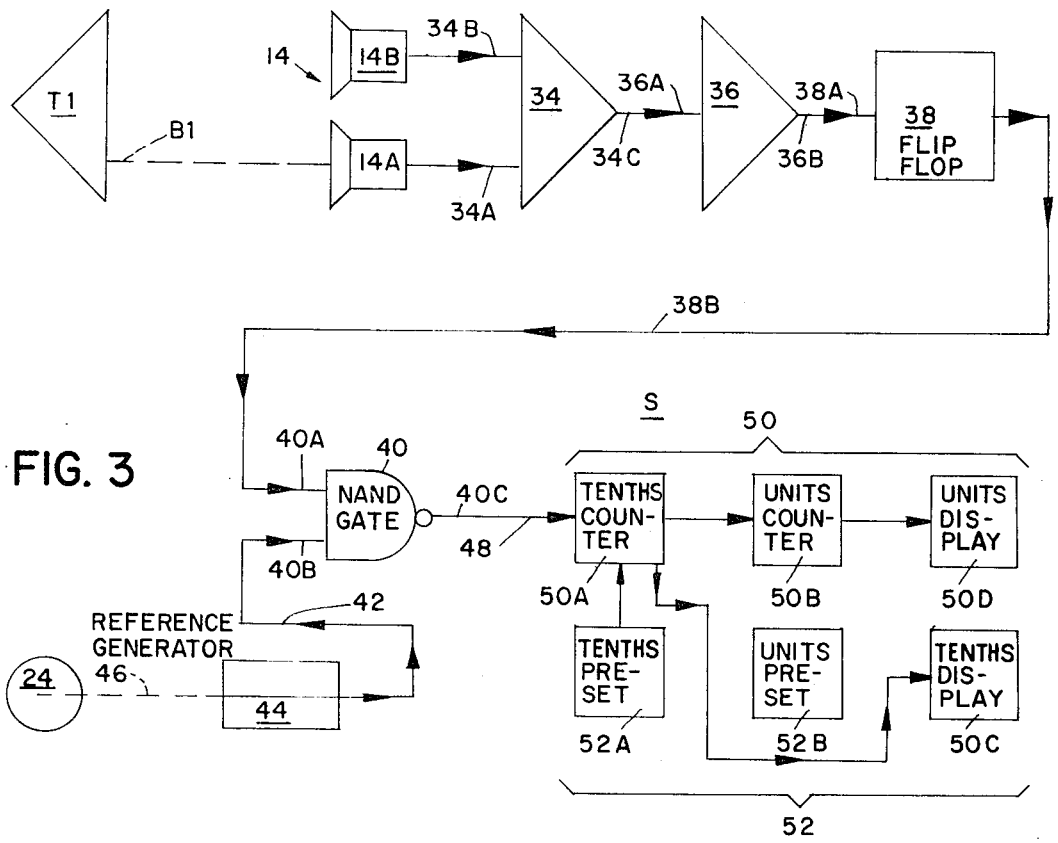
FIG. 3 is a block diagram of a laser beam projecting, reflecting and detecting system of the present invention for a single laser beam cooperating with a single retro-reflective target device or a spaced series of the latter.

Referring to FIG. 3, a grade deviation measuring system S for correlating the information obtained from a single (first) laser beam B1 and a retro-reflective (first) target T1 (previously described with reference to FIG. 1) will now be described, like elements to FIGS. 1A, 1B, 2A and 2B bearing like numerals.

The laser projection and detection means 14 is shown as comprising a combined laser beam projector and beam reflection detector 14A coupled with an ambient light detector 14B to respective signal input terminals 34A and 34B of a differential amplifier 34.

The differential amplifier 34 provides an output signal in response to a detected reflection of the laser beam B1 from the retro-reflective target T1 which is applied through an output connection 34C to the input terminal 36A of an amplifying and squaring circuit 36.

The amplifying and squaring circuit 36 provides a rectangular output pulse for each detected reflection of the laser beam B1 from the target T1 and applies this pulse through an output lead 36B to the input terminal 38A of a flip-flop circuit 38.

The flip-flop circuit 38 is triggered by each output pulse received at its input 38A to effect a change of state therein and provide a gating pulse on its output lead 38B for each output pulse received at its input 38A, i.e., a gating pulse on its output lead 38B for each detected retro-reflection of the laser beam B1 from the target T1.

The gating pulse on the output lead 38B is applied to a first gate terminal 40A of a NAND gate 40, the latter having a second gating terminal 40B connected to the output lead 42 of a reference pulse generator 44, the latter being driven through a mechanical coupling 46 by the dirigible wheels 24 of the grader 12 (FIGS. 1A, 1B) to provide a reference pulse on the output lead 42 for each predetermined equal increment of distance travelled by the dirigible wheels 24 (and the grader 12) along the longitudinal axis L of the roadbed 18 (FIG. 1A).

The output lead 40C of the NAND gate 40 is connected to the input terminal 48 of a digital readout decade counter 50. Nominally, the counter 50 includes a "tenths" decade counter 50A, a "units" decade counter 50B, a "tenths" readout display 50C and a "units" readout display 50D.

A setpoint or preset circuit means 52 is associated with the counter circuit 50 and includes a "tenths" preset circuit 52A for the "tenths" counter 50A and an "units" preset circuit 52B for the "units" counter 50B.

The setpoint or preset circuits 52A, 52B are utilized to compensate for the amount of tire sinkage into a roadbed. Graders are quite heavy and various amount of vertical sinkage occur depending upon the subsoil of the roadbed and the condition thereof. On any given road section, however, such conditions tend to be very consistent. Thus, a built in deviation can be effected to compensate the variation in vertical displacement of the laser beams B1 and B2 from the surface of the roadbed 18 (FIG. 1) due to this tire sinkage.

OPERATION OF THE GRADE DEVIATION DETERMINING SYSTEMS

While certain of the components in the grade deviation determining system S are essential to optimum operating capabilities and will be hereinaftermore fully described the general operation of the system S will now be described with joint reference to FIGS. 1A, 2A and 3.

As the grader 12 travels down the longitudinal axis L of the road surface 18, the dirigible wheels 24, via the coupling 46, drive the reference generator 44 to effect an output pulse for every tenth of an inch (0.1 inch) traverse of the axis L by the road grader 12. Therefore, the second gate terminal 40B of the NAND gate 40 receives via lead 42, a train of pulses indicative of the linear displacement of the grader 12.

The preset circuits 52 (52A, 52B) have been set such that a readout from the tenths and unit displays 50C, 50D will indicate the actual deviation of the first laser beam B1 from the target center TC of its preset, cooperating first target T1 after a complete traverse of the said first target T1 by the said first laser beam B1.

The first laser beam B1 will eventually strike the first retroreflective target strip 28A and will be reflected substantially back upon itself and be detected by the laser detector 14A in the detector circuit 14, causing the differential amplifier 34 to effectuate an output pulse on its output lead 34C and input terminal 36A of the squaring circuit 36, whereupon, the latter will generate a square wave output pulse at its output terminal 36B. The square wave output pulse will be applied to the input terminal 38A of the flip-flop circuit 38, causing the latter to change state and apply a gating signal to the first gate terminal 40A of the NAND gate 40 through the output lead 38B of the flip-flop 38.

The occurrence of a gating signal at the first gate terminal 40A of the NAND gate 40 turns the latter ON and permits the train of displacement measuring pulses at the second gate terminal 40B from the reference generator 44 to pass through the NAND gate 40, out through its output terminal 40C and into the input terminal 48 of the decade Counter 50.

The NAND gate 40 will remain "ON" until the gating signal is removed from its first gate terminal 40A, i.e., when the first laser beam B1 traverses the target configuration 30 of the target T1 and impinges upon the second retro-reflective strip 28B, thus returning flip-flop 38 to its original condition.

The detection of the latter retro-reflection by the laser detector 14A causes a change in state of the flip-flop 38 as previously described, and therefore, constrains the system S to remove the gating signal from the first gate terminal 40A of the NAND gate 40.

The removal of the gating signal constrains the NAND gate 40 to turn OFF and terminate the passage of reference pulses therethrough, thereby terminating the count of the number of reference pulses by the decade counter 50.

This fixes the tenths and units readout displays at the value representative of the deviation of the first laser beam B1, above or below the target center TC (desired grade reference point) for the last immediate traverse of the first target T1 by the first laser beam B1.

Accordingly, the driver of the grader 12 will know what correction in the height and attitude of the grader blade 22 must be made on the next pass of the grader and first laser beam B1 past the first target T1.

As previously described, the target configuration 30 of the target T (T1, T2) is so shaped and so proportioned that a horizontal traverse $x$ thereacross, by the first laser beam B1 is equal to the height H of that traverse on the vertical axis of the target configuration 30. Since the target center C is on that axis, the distance between retro-reflections of the first laser beam B1 is equal to its vertical displacement from the target apex 32.

This distance is directly measured to the nearest tenth of an inch (0.1 inch) by the count of the reference pulses from the reference generator 44 which passed through the NAND gate 40 to the decade counter 50 between the application and removal of the gating signal at the first gate terminal 40A of the NAND gate 40 upon the occurrence, respectively, of the first and second retroreflections of the first laser beam B1 from the first and second target strips 28A and 28B of the first target T1 during the traverse thereof by the said laser beam B1.

It is now readily seen that the decade counter 50 can be preset to a predetermined negative count representative of a "zeroed" condition, i. e., the coincidence of the laser beam B1 with the target apex 32, whereby a "tru zero" condition, i.e., the coincidence of the laser beam B1 with the target center TC will be indicated by a zero deviation readout on the decade displays 50C, 50D.

Therefore, the number of reference pulses gated to the decade counter 50 during a traverse by the laser beam B1 of the target T1 will provide a direct readout at the tenths and units displays 50C, 50D, to the nearest tenth of an inch, of the vertical deviation of the laser beam B1 from the target center TC, which is substantially identical to the vertical deviation of that side of the grader blade 22 from the desired grade line GL.

With a deviation measuring system S for each of the laser beams B1 and B2, the drive of the grader 12, with a suitable readout console to be hereinafter described, will have an instantaneous indication of the deviation of the actual surface of the roadbed 18 from the desired gradeline GL at the point at which each pair of targets T1 and T2 are located.

Now, with these pairs of targets T1 – T2 spaced along a desired roadway, the driver of the grader 12 can program the depth of cut and attitude of the grader blade 22 to effect the proper grade of the roadbed 18 on a subsequent pass of the grader 12 along that roadbed or a portion thereof.

In addition to the preferred embodiment of the system S, a number of variations are contemplated.

For example, the retro-reflective patterns on the targets T1–T2 can be comprised of a plurality of equally spaced stripes to effect retroreflections representative of prescribed increments of distance.

Further, the use of a solid V-shaped pattern with a chopped or modulated laser beam will provide a retro-reflected signal that, when correlated with the velocity of the grader 12, will effect computation of elevation deviation of the roadbed 18.

Thus, by proper correlation of the retro-reflective target patterns with the parameters of distance, time, or velocity, a variety of embodiments of the system S can be utilized for determining the deviations between desired like parameters of surfaces and the like at different locations in space.

Furthermore, the road grader 12 can be any ambulatory carrier or means effecting relative motion between the laser beams (S) B1 and/or B2 and the target (S) T1 and/or T2, such that the said beam (S) will sweep across the said target (S) and effect retro-reflections representative of the informational constraints of the retro-reflective pattern (S) on the said target (S).

As an alternative to the correlation by the system S of the advance of the road grader 12 and the occurrence of retro-reflections of the laser beams B1 and B2, the targets T1 and T2 can be visually observed by the operator of the grader and the deviation of desired grade determined by the position on the target of the red glow or spot caused by impingement of the laser beam thereon. For this purpose the targets can comprise any suitable reflective surfaces on which an index mark is placed indicating the desired position of the line parameter GL defining the grade of the road surface 18.

THE REFERENCE GENERATOR

Figure 4:
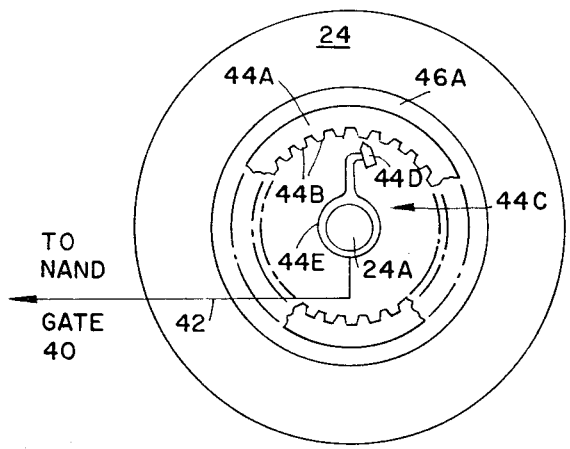
FIG. 4 is a front plan view of a grader driven function generator providing a series of output pulses as a function of the longitudinal advance of a road grader along the roadbed as an input to the system of FIG. 3.
Figure 5:
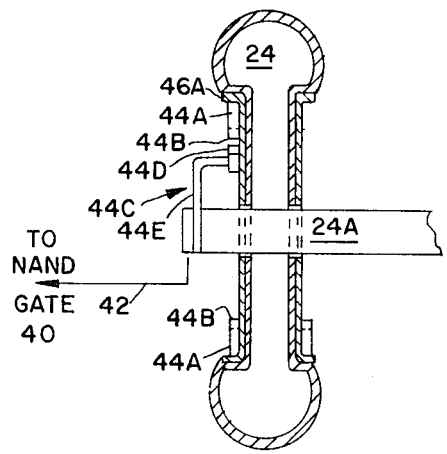
FIG. 5 is an end view of the function generator of FIG. 4.

The reference generator 44, previously designated in reference to the grade deviation measuring system S in FIG. 3, will now be described in detail with reference to FIGS. 4 and 5.

The mechanical coupling (designated as 46 in FIG. 3) between the dirigible wheel 24 and the reference generator 44 comprises the rim 46A of the wheel 24 on which is concentrically mounted, for rotation with the rim 46A, a toothed rotor ring 44A having a plurality of inwardly directed radial rotor teeth 44B. The rotor teeth 44B are uniform in size and spacing and are so-shaped and so-proportioned that each said rotor tooth 44B is representative of a predetermined increment of surface travel of the wheel 24, its axle 24A, and the road grader 12(FIG. 1A). For example, the rotor teeth 44B can be dimensioned such that the advance of each tooth past a given fixed point, during rotation of the wheel 24, represents one-tenth of an inch of surface travel of the wheel 24 (and grader 12).

The reference generator 44 is completed, basically, by an electro-magnetic transducer 44C which comprises a fixed magnetic transducer head 44D mounted on the fixed axle 24A of the dirigible wheel 24 by a fixed radial arm 44E, extending from the axle to position the transducer head 44D at a position immediately adjacent the rotor teeth 44B.

The toothed rotor ring 44A and the transducer head 44D are of materials and configuration known in the art to transmit one output pulse from the transducer head 44D through the leads 42 to the input terminal 40A of the NAND gate 40 in the deviation measuring system S as previously described with reference to FIG. 3 each time one of the teeth 44B passes the transducer head 44D.

The reference generator 44 can include a pulse shaping network not shown, to refine the pulses generated in the transducer head 44D to a shape compatible with the requirements of the NAND gate 40.

The foregoing embodiment of the reference generator 44 is exemplary of one preferred embodiment thereof. Any suitable combination of elements known in the art which will produce a pulse for each given incremental distance of surface travel of the road grader 12 is suitable for use in the present invention.

As previously stated, such pulses should be of a shape compatible with the requirements of the NAND gate 40 and such shape can be effectuated by techniques and pulse shaping networks well known in the art.

AMBIENT LIGHT COMPENSATION

In order to provide optimum versatility of the road grader systems of the present invention, the effects of variable ambient lighting conditions must be overcome.

This increases system sensitivity to valid data in the form of retro-reflective responses from the targets T while preventing response to spurious flashes and other light level variations.

Figure 6:
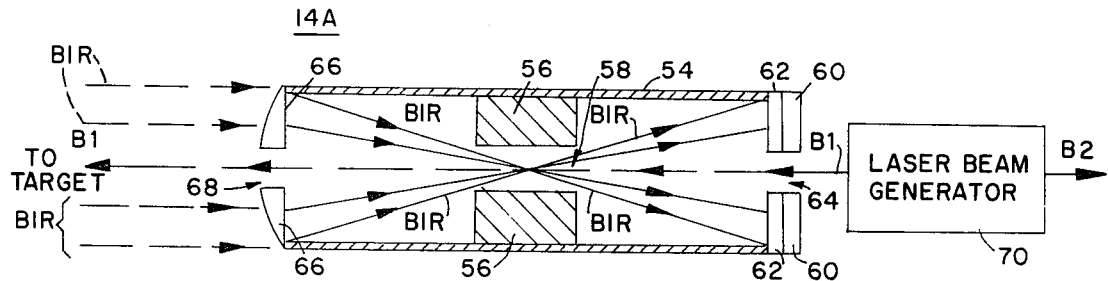
FIG. 6 is a cross-sectional view of a laser beam detection and projection transducer and/or ambient light detector utilizing optical collimation, for providing an input to the system of FIG. 3.

Referring to FIG. 6, a first embodiment of the laser beam projection and retro-reflection detecting transducer 14A (previously designated in FIG. 3) is shown as comprising an opaque-walled enclosure or housing 54 of cylinderical configuration having a collimating iris 56 at the center thereof defining a light port 58 through which both the outgoing laser beam B1 and its retro-reflections B1R are transmitted, as will now be further described.

The internal end (right hand end as shown) of the transducer 14A is partially closed by an inwardly facing photoelectric cell device 60 having an optical notch filter 62 laminated or overlayed on its obverse (internal) surface. A laser beam input port 64 is defined in the center of the cell 60 and filter 62, coaxial with the central light port 58 in the iris 56.

The external end (left hand as shown) of the transducer 14A is covered by a receiving lens 66, having a laser beam transmitting port 68 centrally defined therein, coaxial with the central light port 58 and the beam input port 64. The receiving lens 66 is convergent to received retro-reflections BIR of the transmitted laser beam B1 and has its focal point substantially at the center of the central light port 58 and iris device 56.

The internal end of the transducer 14A is immediately adjacent a laser beam generator 70, which, in a preferred embodiment to be hereinafter described, generates the first and second laser beams B1 and B2 in opposed straight line relationship with one another.

The first laser beam B1 is transmitted from the laser generator 70, through the beam input port 64, central light port 58 and beam output port 68 substantially coaxially of these ports and of the opaque housing 54 in a direction perpendicular to the direction of travel of the drive wheels 20 of the grader 12 (FIG. 1A) at any given instant.

Upon the retro-reflection B1R of the first laser beam B1 from a given target T, T', T1, T2 (FIGS. 2A, 2B, 1A), which necessarily involves a slight divergence of the dimensions of the transmitted beam B1, the retroreflection B1R is collimated to flood the obverse face of the photoelectric cell 60 by passing through the convergent receiving lens 66, central light port 58 and optical notch filter 62.

The optical notch filter 62 is utilized to narrow the response band of the transducer 14A to minimize saturation of the transducer 14A.

Figure 7:
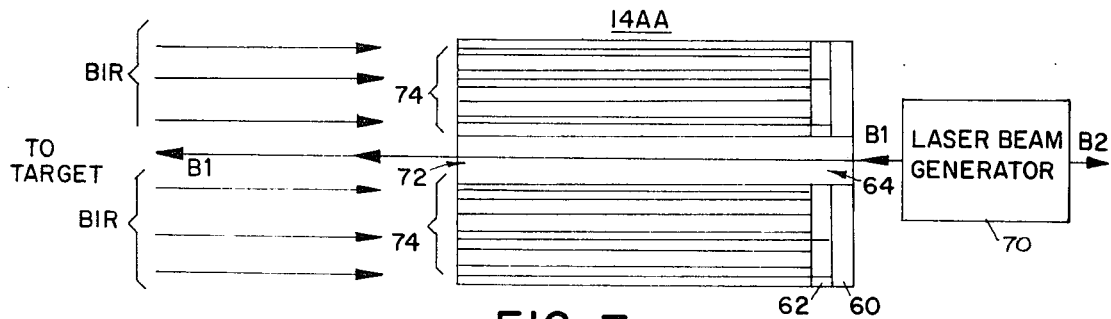
FIG. 7 is a cross-sectional view of another embodiment of a laser beam detection and projection transducer and/or ambient light detector utilizing mechanical collimation, for providing an input to the system of FIG. 3.

Referring now to FIG. 7, a second embodiment 14AA of the transducer 14A will now be described, with like elements to FIG. 6 bearing like numerals.

The opaque cylindrical housing 54 has elongated, coterminate coaxial light transmitting port 72 therethrough, coaxial with the beam inlet port 64 in the photoelectric cell 60 and optical notch filter 62, which transmits the first laser beam B1 emanating from the laser beam generator 70. The remainder of the opaque housing is comprised of a plurality of parallel light transmitting channels or pipes 74, from optical fibers, tubes or honeycomb lattice structures and the like, extending from the external end of the housing 54 into juxtaposition with or immediately adjacent to the obverse surface of the optical notch filter 62.

As shown, a retro-reflection B1R of the laser beam B1 will impinge upon the obverse ends of the light channels 74 and thus be collimated by the boundaries and multiplicity of these channels 74 to flood the obverse face of the photoelectric cell 60.

The ambient compensation for the grade deviation measuring system S is achieved by the use of an additional transducer 14B (of substantially identical structure or response as the transducers 14A or 14AA as the case may be) positioned adjacent the beam transmitting transducer 14A (or 14AA) with the central axes of both substantially parallel but out of range of the retro-reflected laser beam. This is generally indicated in FIG. 3.

Figure 8:
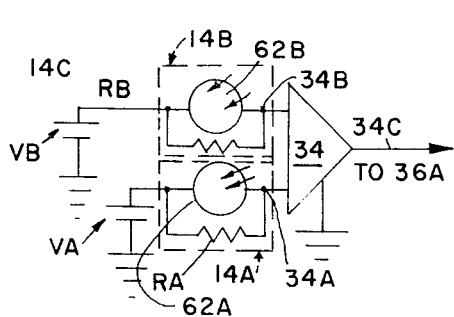
FIG. 8 is a schematic diagram of an ambient light compensating and input driver network embodying the transducers of FIGS. 6 or 7.

Referring now to FIG. 8, a first preferred ambient compensation transducer network 14C is schematically shown as including first and second photoelectric cells 60A and 60B, selenium type, such as solar cells, in series between the positive terminals of bias sources VA and VB and the input terminals 34A and 34B, respectively, of the differential amplifier 34 previously defined with respect to the system S of FIG. 3.

Loading resistances RA and RB are connected in shunt with the photoelectric cells 62A and 62B, respectively, and the negative sides of the bias sources VA and VB are grounded to complete the network 14C.

The response of the photoelectric cells 62A and 62B to ambient light conditions is substantially identical and the resulting change in output voltage thereof, assuming substantially identical bias from the bias sources VA and VB, effects the application of signal of like strength to the input terminals 34A, 34B of the differential amplifier 34.

Characteristically, the amplifier 34 amplifies only the differences in the signals received at its two input terminals 34A and 34B, and hence, no output signal will result from ambient light variations.

Upon the occurrence of a retroreflection B1R of the first laser beam B1, however, this will be detected by the beam transducer 14A and the change in output voltage of the photoelectric cell 64A will increase accordingly. Therefore, a difference will exist in the signal strengths applied to the input terminals 34A, 34B and the differential amplifier 34 will produce an output pulse at its output terminal 34C.

Figure 9:
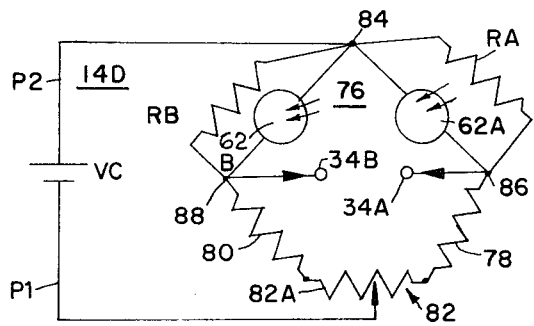
FIG. 9 is a schematic diagram of another embodiment of an ambient light compensating network embodying the transducers of FIGS. 6 or 7.

An alternate embodiment 14D of the ambient compensating network 14 is shown in FIG. 9, with the photoelectric cells 62A and 62B, and their respective loading resistances RA and RB forming two adjacent arms of a Wheatstone bridge circuit 76, the opposite two arms of which comprise two fixed resistances 78 and 80 linked in series by the entire resistance 82A of a balancing potentiometer 82. The latter includes a sliding tap 82B which serves as one input terminal of the bridge 76 and is connected to the negative side of a bias source VC by a first lead P1.

The second input terminal of the bridge 76 consists of a common circuit junction 84 between the like terminals of the calibrating resistors RA, RB and photoelectric cells 62A and 62B. This junction 84 is connected to the positive side of the bias source VC by a second lead P2.

The output terminals of the bridge 76 coincide with the input terminals 36A, 36B of the differential amplifier 36 (not shown) previously described in connection with FIGS. 3 and 8; and consist respectively, of a circuit junction 86 between the first photoelectric cell 62A, its loading resistance RA and fixed resistance 78 and of a circuit junction 88 between the second photoelectric cell 62B, its loading resistance RB and the other fixed resistance 80.

In this embodiment, the initial ambient conditions encountered can be balanced to a null condition across the bridge output terminals 86 (34A) and 88 (34B) thereby constraining the amplifier 36 (FIGS. 3 and 7) to effect an output signal only in response to the receipt of a retro-reflection by the photoelectric cell 62A. This provides a practical field adjustment for such eventualities as dirt on lenses and other unequal parameters of the transducers 14A and 14B which may arise under field conditions.

THE LASER BEAM PROJECTION AND DETECTION UNIT

Figure 10B:
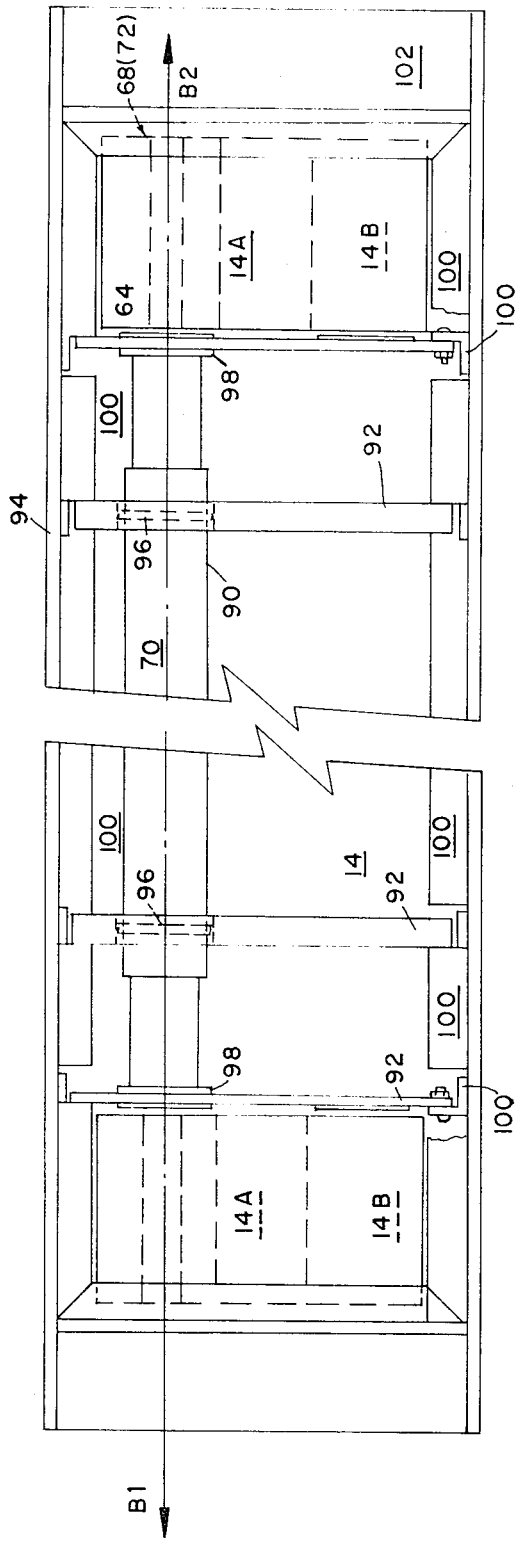
Figure 10C:
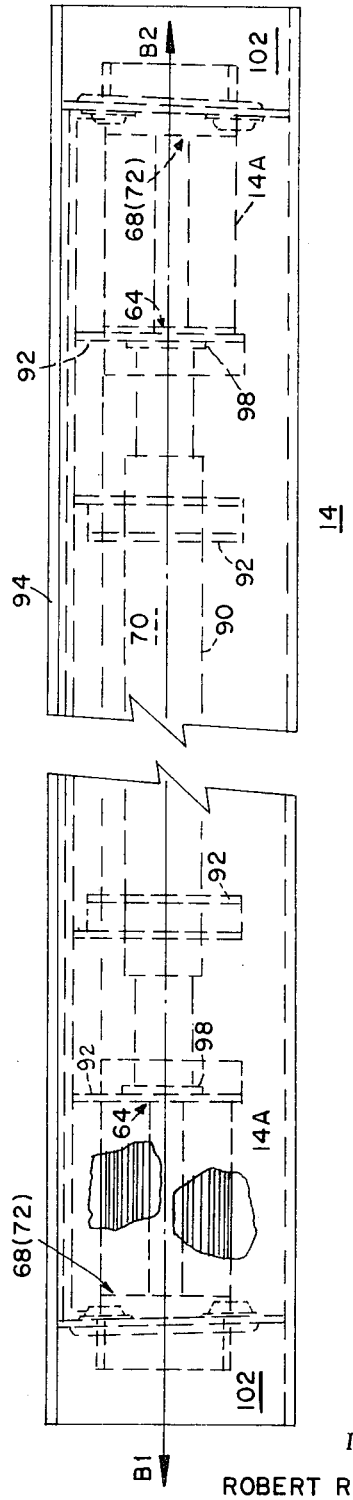

Referring now to FIGS. 10A, 10B and 10C the laser beam projection and detection means 14, previously described in part in connection with FIGS. 1A, 1B, 3, 6, and 7, will be described in detail.

The laser beam generator 70, is shown as comprising an elongated laser tube structure 90 mounted in a plurality of bulkhead-like brackets 92 within a hollow, elongated, substantially rectangular housing 94 enclosing the beam projecting and detecting unit 14.

The innermost of the brackets 92 include elastomeric o-rings 96 which provide shock absorbing protection for the laser generator 70.

The outermost of the brackets 92 are elastomeric retaining collars which constrain the laser tube structure 90 horizontally and provide isolation from longitudinal shock. The projecting and detecting transducers 14A are mounted one at either end of the tube structure 90 such that the opposed laser beams B1 and B2 emitted from the said tube structure 90 pass coaxially through respectively adjacent ones of said transducers 14A (or 14AA, as the case may be) and the coaxial light ports 64, 58, 68 (or 64, 72).

A plurality of internal bosses 100 are provided within the unit housing 94 to provide mounting and spacing means for the mounting brackets 92 and for sealing cover 110.

The outer ends of the unit housing 94 comprise extensions 102 which serve as dust and dirt shields for the transducers 14A (14AA) and 14B.

These transducers are modular in construction and are bolted or otherwise secured in the ends of the unit housing 94, recessed in the dust and dirt shields 102, by means of face plates 104, the latter including cover lenses or optical windows 106 to preclude the entry of foreign matter into the said transducers 14A (14AA) and 14B.

As specifically shown in FIG. 10A, the entire projecting and detecting unit 14 is rigidly secured to the grader frame 16 by means of a welded bracket 108 which is fixed to the top surface of the unit housing 94.

As previously related with reference to FIGS. 1A and 1B, the unit 14 is positioned between the drive wheels 20 and the grading blade 22 of the road grader 12.

THE READOUT DISPLAY PANEL

The information derived from the grade deviation measuring and display systems, previously described with reference to FIG. 3, must be conveyed to the operator of the grader 12 (FIGS. 1A, 1B) to indicate the necessary corrections in height and attitude of the grading blade 22 with respect to each of the targets T1 and T2 (FIGS. 1A, 1B).

As previously described in conjunction with the system S (FIG. 3), the display modules 50C and 50D provide readout information for the deviation from desired grade of the roadbed surface to the nearest tenth of an inch. One system S for each of the laser beams B1, B2 is utilized in practice and the information readout is effected preferably on a common display panel.

Referring to FIG. 11, a readout display panel 110 is shown as including right-hand and left-hand sets of tenth and unit digital display readouts 50C and 50D, for the grade deviation detected by the first and second laser beams B1 and B2, respectively.

The preset circuits 52A and 52B for each set of display modules 50C – 50D are gang-controlled by suitable linkage (not shown) through left and right preset control knobs 52CL and 52CR, respectively.

A reset button RB common to both the left and right sets of display modules 50C – 50D is provided on the face of the display panel to effect reset of the digital information to the set point (preset zero) upon actuation by the driver of the grader 12.

Incorporated with each of the left and right sets of display modules 50C – 50D are left and right algebraic sign displays 50F which indicate, respectively, the vertical sense of the deviation of the laser beams B1 and B2, and hence the left and right hand limits of the grading blade 22, from the desired target center TC and reference grade GL, respectively. Accordingly, a negative sign (−) on the display module 50F will indicate a deviation below the desired grade GL while a positive sign (+) on a display module 50F will indicate a deviation above the desired grade line GL.

Balance control knobs 82C and trouble lights 82D are provided on the panel 110 for indicating to the driver of the grader 12 that an unbalance exists in either of the left or right hand systems S due to uneven dirt accumulations on windows or such which should be corrected manually by control knobs 82C. An unbalance will cause illumination of the trouble light 82D. The control knob 82C is thus rotated in the direction necessary to extinguish the trouble light 82D, which extinguishment indicates a balanced condition in its associated system S.

For example, the balance control knobs 82C are mechanically coupled (not shown) to the variable tap 82B on the balance potentiometer 82 in the detector circuit 140 of FIG. 9, to balance the detector 14 when unusual ambient light variations are encountered.

As can be readily seen from the foregoing specification and drawings the present invention provides a new and novel deviation detecting and measuring system which satisfies a long felt need in the art for a precise and reliable method and means to establish the deviation from and the ultimate achievement of desired grade or other predetermined parameters.

What is claimed is:

1. Measuring means determining the deviation of a line parameter of a given planar surface from a like line parameter of a desired planar surface proximate thereto, said means comprising:
    laser beam generating means projecting first and second laser beams in substantially opposed, predetermined, relative orientation at known given vertical displacements from said given surface;
    first and second retro-reflective target means mounted on either side of said given surface at a known orientation with a known line parameter of said desired surface for substantially simultaneous impingement, respectively, by said first and second laser beams;
    said target means having areas of retro-reflective material thereon in a predetermined pattern functionally related to the deviation between said like line parameters and effecting retro-reflections of a laser beam impinged thereon and traversing same, modulated as a function of said deviation;
    ambulatory means mounting and moving said generating means across said given surface substantially orthogonally of said known line parameter of said desired surface and constraining said laser beams to sweep across said target means to produce retro-reflections therefrom modulated as a function of said deviation;
    detector means mounted on said ambulatory means immediately adjacent said generator means receiving said retro-reflections of said beams from said target means and providing an output signal indicative of the occurrence of said retro-reflections;
    reference generator means providing a reference signal having a value functionally related to the movement of said generator means and said laser beams across said given surface and said target means; and
    correlating means receiving said detector output signal and said reference signal and deriving an error signal therefrom having a value representative of said deviation between said line parameters.

2. The invention defined in claim 1, wherein said measuring means further comprises readout means receiving said error signal from said correllating means and providing a visual readout of the value of said deviation.

3. The invention defined in claim 1, wherein said detector means comprises first and second detector devices receiving, respectively, said retro-reflections from said first and second target means and producing representative output signals; and wherein said correlating means comprises first and second correlating devices receiving, respectively, said representative output signals from said first and second detector devices and said reference signal, and deriving, respectively, first and second error signals having values respectively representative of the said deviation of said line parameters at the locations of said first and second target means.

4. The invention defined in claim 1, wherein each of said target means comprises a V-shaped retro-reflective pattern having its apex at a known vertical displacement from said desired line parameter, and having its axis of symmetry vertically disposed.

5. The invention defined in claim 1, wherein each of said target means comprises a V-shaped retro-reflective pattern having its apex at a known vertical displacement from said desired line parameter, and having its axis of symmetry vertically disposed; and wherein said retro-reflective pattern comprises first and second retro-reflective, rectilinear areas substantially defining the letter V.

6. The invention defined in claim 1, wherein said reference generator means includes means constraining said reference signal to define the distance traversed over said given surface by said laser beams during any given interval of time.

7. The invention defined in claim 1, wherein each of said target means comprises a V-shaped retro-reflective pattern having its apex at a known vertical displacement from said desired line parameter, and having its axis of symmetry vertically disposed; and wherein said retro-reflections from each said target means define the interval of impingement of said laser beams on the respectively associated ones of said target means.

8. The invention defined in claim 1, wherein said reference signal defines the distance traversed over said given surface by said laser beams during any given interval of time; wherein each of said target means comprises a V-shaped retro-reflective pattern having its apex at a known vertical displacement from said desired line parameter, and having its axis of symmetry vertically disposed; and wherein said retro-reflections from each said target means define the interval of impingement of said laser beams on the respectively associated ones of said target means.

9. The invention defined in claim 1, wherein each of said target means comprises a V-shaped retro-reflective pattern having its apex at a known vertical displacement from said desired line parameter, and having its axis of symmetry vertically disposed; and wherein said retro-reflective pattern comprises first and second retro-reflective, rectilinear areas substantially defining the letter V; wherein said retro-reflections from each of said target means comprise first and second retro-reflected pulses applied to said detector means at the initiation and termination, respectively, of the interval of time each said beam is impinging said V-shaped pattern of its respectively associated target; and wherein said reference signal applied to said correlating means comprises a train of reference pulses in which each pulse is representative of a known increment of travel of said laser beams across said given surface.

10. The invention defined in claim 9, wherein said detector means comprises first and second detector devices contrained by said first and second retro-reflected pulses to provide ON and OFF output signals defining said interval of time for each of said target means; and
    wherein said correlating means includes first and second gate means receiving said reference pulses and said ON and OFF output signals from said first and second detector devices, respectively, said gate means being contrained to transmit said reference pulses therethrough in response to said ON signal and preclude such transmission in response to said OFF signal, and first and second counting means, receiving said transmitted reference pulses from said first and second gate means, respectively, deriving pulse counts representative of said deviation of the line parameter of said given surface from the line parameter of said desired surface at the location of each of said target means.

11. The invention defined in claim 10, wherein said counting means includes visual readout means.

12. The invention defined in claim 1, wherein said ambulatory means comprises a road grader having a frame, drive wheels on said frame at one end thereof and dirigible wheels on said frame at the other end thereof riding on said given surface; and wherein said laser beam generating means is mounted on said frame in close proximity with said drive wheels such that said first and second laser beams are projected orthogonally of the path of travel of said drive wheels.

13. The invention defined in claim 1, wherein said ambulatory means comprises a road grader having a frame, drive wheels on said frame at one end thereof and dirigible wheels on said frame at the other end thereof riding on said given surface; and wherein said laser beam generating means is mounted on said frame in close proximity with said drive wheels such that said first and second laser beams are projected orthogonally of the path of travel of said drive wheels; and further, wherein said reference generator means comprises a tachometer generator driven by said dirigible wheels.

14. The invention defined in claim 1, wherein said detector means comprises first and second photo-responsive means differentially receiving ambient illumination and said retro-reflections of said first and second laser beams, respectively, each said photo-responsive means including optical means transmitting a respectively associated one of said laser beams therethrough and having a photosensitive detecting device substantially surrounding the said associated one of said laser beams.

15. The invention defined in claim 14, wherein each of said photo-responsive means further includes an additional photosensitive device out of the path of said associated one of said laser beams and receiving only ambient illumination; and wherein said photosensitive devices are connected in a differential detector circuit to provide said detector means with selective response to retro-reflections of said laser beams and preclude spurious response to ambient illumination.

* * * * *